(12) United States Patent
Scott et al.

(10) Patent No.: US 11,198,215 B1
(45) Date of Patent: Dec. 14, 2021

(54) ROBOTIC ARM

(71) Applicants: Joshua Scott, Katy, TX (US); Mark Sullivan, Houston, TX (US); Matthew Werner, Pentwater, MI (US)

(72) Inventors: Joshua Scott, Katy, TX (US); Mark Sullivan, Houston, TX (US); Matthew Werner, Pentwater, MI (US)

(*) Notice: Subject to any disclaimer, the term of this patent is extended or adjusted under 35 U.S.C. 154(b) by 0 days.

(21) Appl. No.: 16/997,033

(22) Filed: Aug. 19, 2020

Related U.S. Application Data

(60) Provisional application No. 62/888,611, filed on Aug. 19, 2019.

(51) Int. Cl.
| | |
|---|---|
| *B25J 9/10* | (2006.01) |
| *B25J 9/02* | (2006.01) |
| *B25J 17/02* | (2006.01) |
| *B25J 9/12* | (2006.01) |
| *B25J 15/00* | (2006.01) |
| *F16H 19/06* | (2006.01) |
| *B25J 9/04* | (2006.01) |

(52) U.S. Cl.
CPC ............... *B25J 9/023* (2013.01); *B25J 9/104* (2013.01); *B25J 9/108* (2013.01); *B25J 9/12* (2013.01); *B25J 15/0052* (2013.01); *B25J 17/0241* (2013.01); *F16H 19/06* (2013.01); *B25J 9/026* (2013.01); *B25J 9/041* (2013.01); *F16H 2019/0681* (2013.01); *F16H 2019/0695* (2013.01)

(58) Field of Classification Search
CPC .......... B25J 9/104; B25J 9/1045; B25J 19/06; F16H 19/06; F16H 19/0663; F16H 2019/0681; F16H 2019/0686; F16H 2019/0695

USPC ....... 414/749.1, 751.1, 753.1; 74/89.2, 89.22
See application file for complete search history.

(56) References Cited

U.S. PATENT DOCUMENTS

| | | | |
|---|---|---|---|
| 3,535,952 A | 10/1970 | Devol | |
| 4,502,830 A | 3/1985 | Inaba et al. | |
| 4,600,355 A | 7/1986 | Johnson | |
| 4,781,517 A | 11/1988 | Pearce et al. | |
| 5,088,610 A | 2/1992 | Garnier | |
| 5,198,736 A * | 3/1993 | Azuma | B25J 9/041 |
| | | | 318/567 |
| 5,533,858 A | 7/1996 | Costa | |
| 6,264,419 B1 | 7/2001 | Schinzel | |
| 6,626,630 B1 | 9/2003 | Lomerson, Jr. et al. | |
| 6,732,609 B2 * | 5/2004 | Asai | B23Q 1/621 |
| | | | 74/490.04 |
| 7,258,521 B2 | 8/2007 | Guerra et al. | |
| 7,281,447 B2 | 10/2007 | Gosselin et al. | |
| 9,114,526 B2 | 8/2015 | Jeong et al. | |
| 2007/0219031 A1 | 9/2007 | Jones | |

FOREIGN PATENT DOCUMENTS

WO    WO2018/216761    * 11/2018

* cited by examiner

*Primary Examiner* — William C Joyce

(74) *Attorney, Agent, or Firm* — Bushman Werner, P.C.

(57) ABSTRACT

A robotic arm assembly having an arm with at least one end effector pivotally connected to the end of the arm. The robotic arm assembly has a continuous belt driven by two motors. Manipulation of the speed and direction of the two motors controls the length of the arm and the tilt of the end effector. A third motor controls the tilt of the arm.

9 Claims, 3 Drawing Sheets

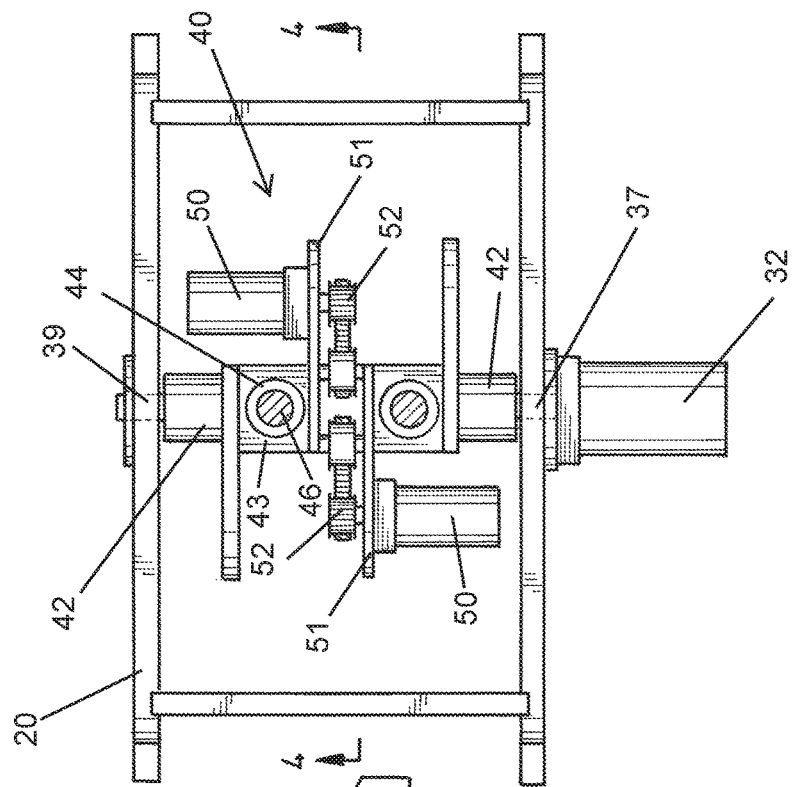
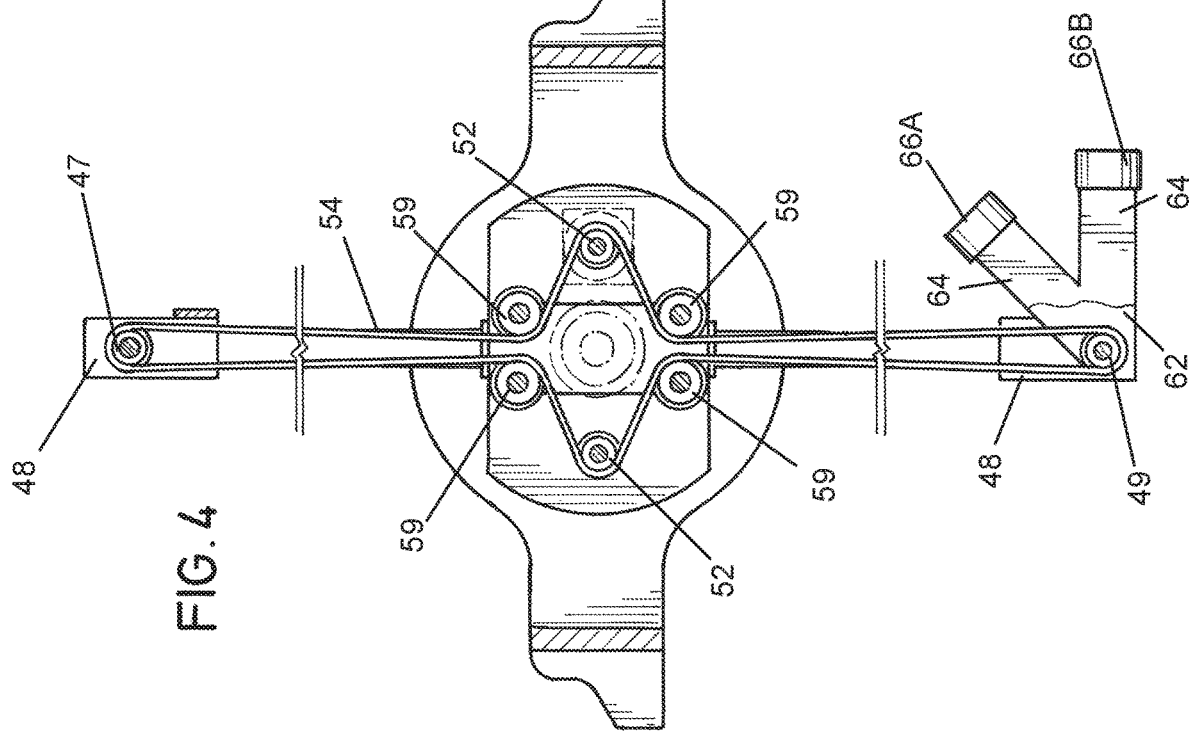

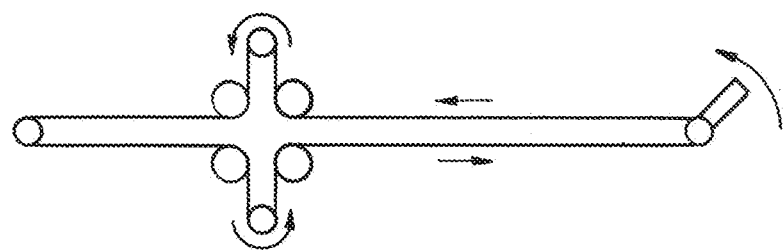
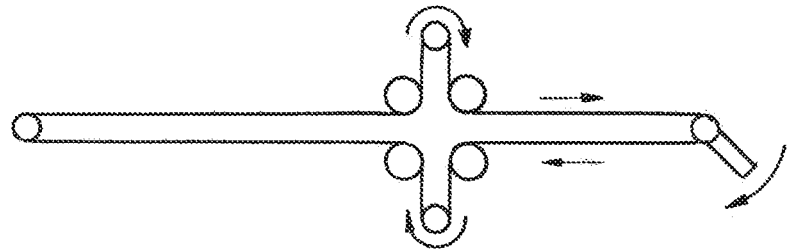
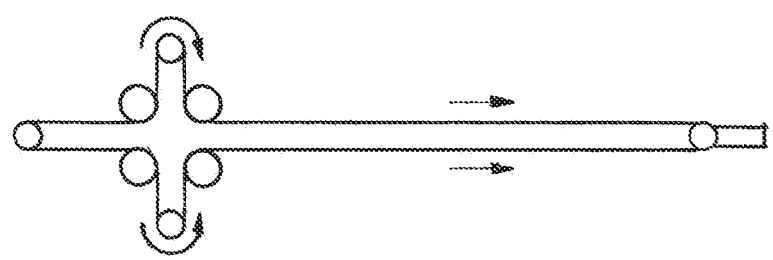
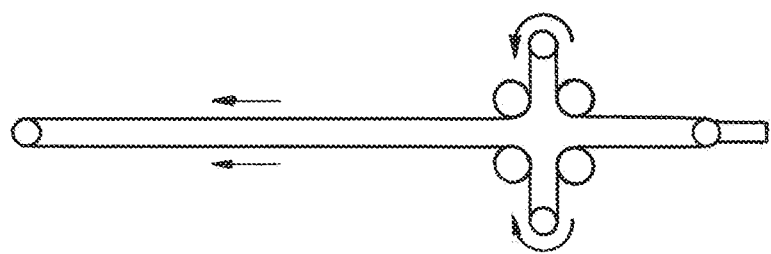
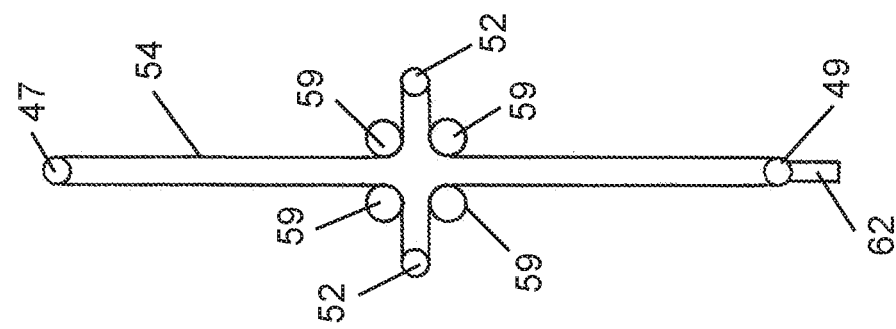

ROBOTIC ARM

CROSS REFERENCE TO RELATED APPLICATION

This application claims priority to U.S. Application No. 62/888,611 filed on Aug. 19, 2019 the disclosure of which is incorporated herein by reference for all purposes.

FIELD OF THE INVENTION

The present invention relates to a robotic arm, more particularly, to a pick and place robotic arm able to grip one or more pieces at a time.

BACKGROUND OF THE INVENTION

Robotic systems are common in automated manufacturing or assembly operations. Such arms can be used to move components from one place to another or attach components to a device. The most common types of robotic systems are gantry robots, selective compliance articulated robot arms (SCARAs), delta arm robots, and industrial robots.

Gantry robots use Cartesian coordinates and are structurally similar to gantry cranes. They are usually quite large as the gantry system must cover the entire area in which the robot will operate. The gantry robot system performs multi-axis linear movements (typically X, Y, and Z or combinations therein).

SCARAs are robotic arms with a single pedestal mount. They are usually smaller and faster than gantry systems. SCARAs are movable in the X-Y directions and have a Z axis mounted at the end to allow for vertical placement of the items they are picking up and placing.

The delta robot is a parallel robot, i.e. it consists of multiple kinematic chains connecting the base with the end-effector. The robot can also be seen as a spatial generalization of a four-bar linkage. The key concept of the delta robot is the use of parallelograms which restrict the movement of the end platform to pure translation, i.e. only movement in the X, Y or Z direction with no rotation. The robot's base is mounted above the workspace and all the actuators are located on it. From the base, three middle jointed arms extend. The ends of these arms are connected to a small triangular platform. Actuation of the input links will move the triangular platform along the X, Y or Z direction.

An industrial robot is a mechanical system which to some degree can replicate human movements and is commonly used for manufacturing. Industrial robots are automated, programmable and capable of movement on three or more axis. Typical applications of robots include welding, painting, assembly, pick and place for printed circuit boards, packaging and labeling, palletizing, product inspection, and testing. They can assist in material handling.

SUMMARY OF THE INVENTION

In one aspect, the present invention relates to a robotic arm system.

In another aspect, the present invention relates to a robotic arm system which operates on a polar coordinate system.

In yet another aspect, the present invention relates to a robotic arm capable of moving in at least three axes.

In still another aspect, the present invention relates to a robotic arm capable of holding and moving one or more components at a time.

These and further features and advantages of the present invention will become apparent from the following detailed description, wherein reference is made to the figures in the accompanying drawings.

BRIEF DESCRIPTION OF THE DRAWINGS

FIG. 3 is a view taken along the lines 3-3 of FIG. 1.
FIG. 4 is a view taken along the lines 4-4 of FIG. 3.
FIGS. 5A-5E demonstrate movement of the swing arms and the flip axis in the embodiment of FIG. 1.

DETAILED DESCRIPTION OF PREFERRED EMBODIMENTS

Figure 1:
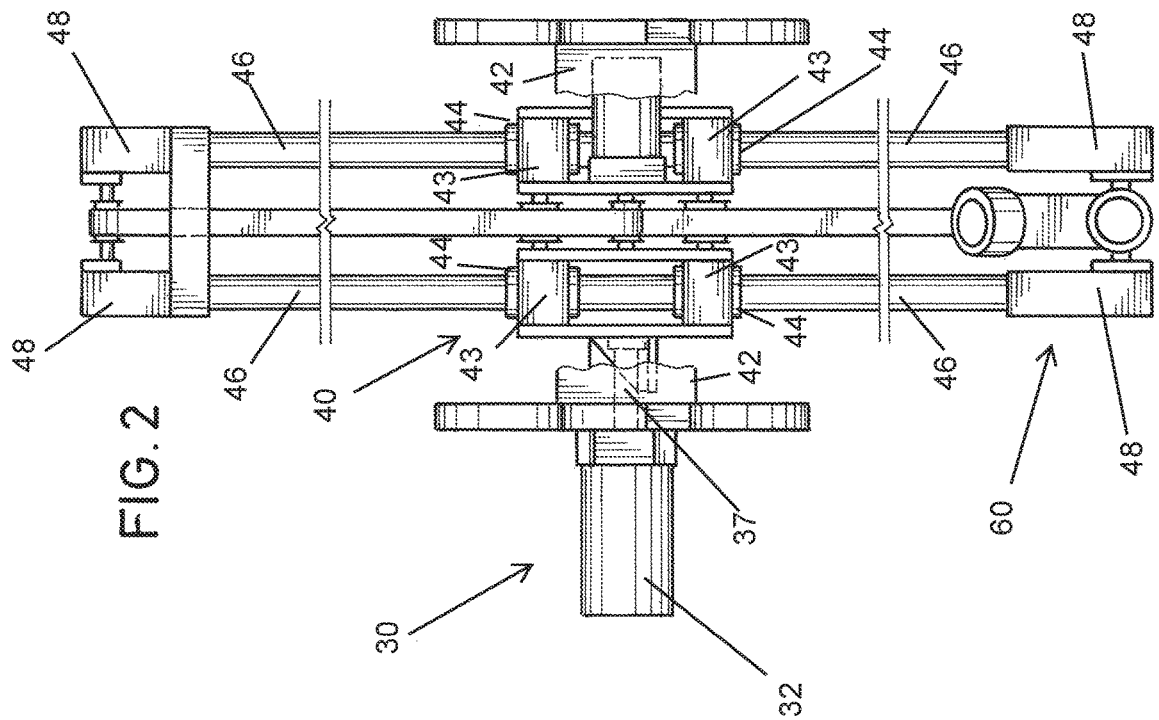
FIG. 1 is a side, elevational view of one embodiment of the robotic arm of the present invention.

Turning to FIG. 1, there is shown, generally as 10, one embodiment of the robotic arm assembly of the present invention. FIG. 1 shows the assembly as it would be mounted to a support frame in the desired operating environment. The operating environment can be a machine, an assembly system, material handling system, or any location that requires objects to be moved from one location to another with a relative amount of precision. It will be appreciated that while the orientation of the assembly of the present invention is depicted in FIG. 1 as generally vertical, mounting in a horizontal or inverted position is also possible and may provide distinct advantages for different tasks. Accordingly, directional terms such as "upper", "lower", and the like are with reference to the orientation depicted in the drawings and are not intended to limit the invention to a specific orientation.

The robotic arm assembly of the present invention is comprised of three main assemblies: the tilt axis assembly; the swing arm assembly; and the flip axis assembly.

As best seen in FIG. 1, the tilt axis assembly of the present invention comprises a frame 20, preferably having mounting points in various places for mounting in the desired operating environment. Affixed to frame 20 is driving system 30 comprised of motor 32 and pivot pin or shaft 37. Motor 32 is operatively connected to pivot pin 37 such that rotation of motor 32 in one direction turns pivot pin 37 in one direction, and rotation of motor 32 in the opposite direction turns pivot pin 37 in the opposite direct. As depicted in the figures, motor 32 is mounted outside of frame 20, but the invention is not so limited. It will be appreciated that the desired operation can be obtained with motor 32 mounted in a different position and may be indirectly connected to pivot pin through the use of one or more pulleys, gears, or the like.

As best seen in FIG. 3, the swing arm assembly of the prevent invention is pivotally connected by pivot pins 37 and 39 to frame 20. The rotation of motor 32 and pivot pin 37 control the angular position of the swing arm axis assembly.

Figure 2:
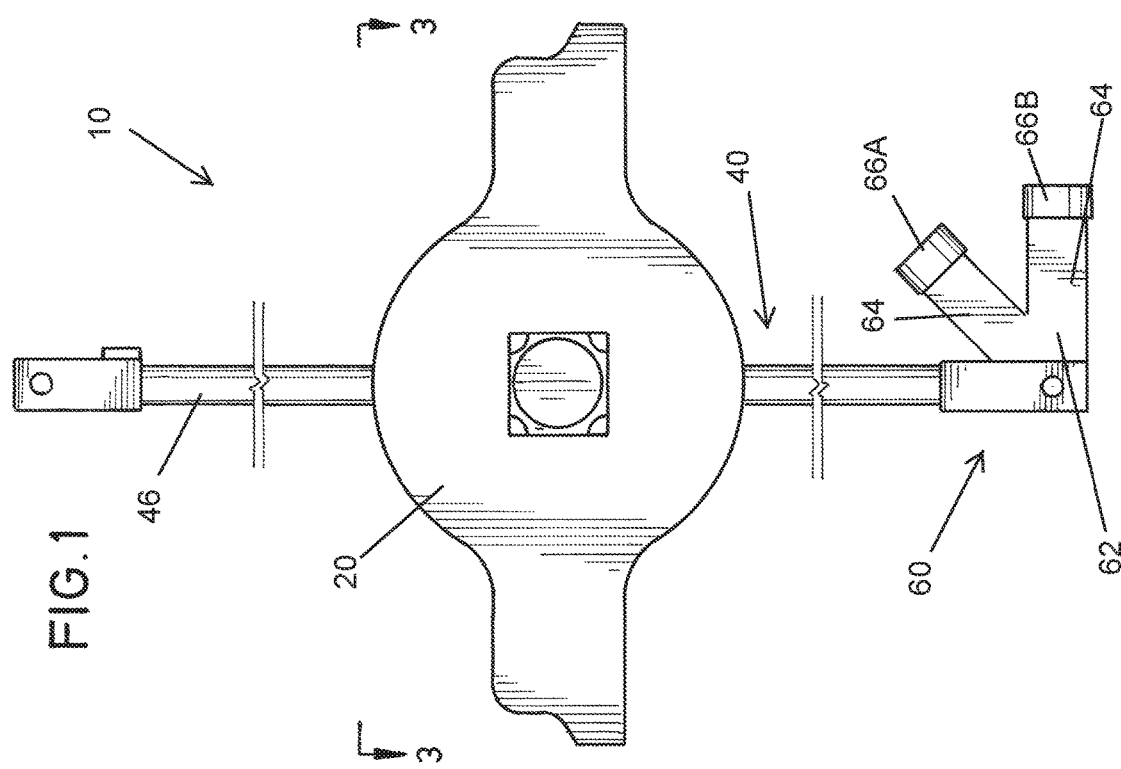
FIG. 2 is a front, elevational view, partly in section of the embodiment of FIG. 1.

Turning to FIGS. 1-3 of the present invention, there is shown the swing arm assembly 40. The swing arm assembly 40 is comprised of a pair of pivot housings 42 each of which are connected to bushing blocks 43 through which linear bushings 44 extend. Pivot housings 42 also support the pivot pins or shafts 37 and 39. A pair of linear rails 46 slidably extend through the linear bushings 44. At the ends of the linear rails 46 are end mounts 48. Idler pulley 47 is rotatably connected to upper end mounts 48. Flip axis pulley 49 is rotatably connected to lower end mount 48. There are two motors 50, each of which is mounted on a respective motor mount 51. The motors 50 each connect to a respective timing pulley 52 mounted on the opposite sides of respective motor mounts 51. to jointly manipulate a timing belt 54 which links the timing pulleys 52, the idler pulley 47 and the flip axis pulley 49. The configuration of timing belt 54 can best be seen in FIGS. 5A-5E, which will be explained more fully later. While the preferred embodiment shown in the figures uses two linear rails 46, it will be understood that the robotic arm assembly could be made with only one rail 46 or with more than two rails 46.

Turning to FIGS. 1 and 4, there is shown the flip axis assembly of the present invention. Flip axis assembly 60 comprises a generally v-shaped housing 62 having legs 64. Each of legs 64 serves as a mounting location for an end effector 66A/66B. It will be understood by those of skill in the art that while depicted with two legs/end effectors, housing 62 can comprise a single leg/end effector, or more than two legs/end effectors, as desired. The exact shape of the housing can vary as needed to achieve the desired movement of the desired number and type of end effectors. For example, housing 62 can be configured such that an end effector remains coaxial with flip axis pulley 49 during operation. It will be further understood by those of skill in the art that the end effector is the portion which will interact with the items to be moved by the robotic arm. Accordingly, the end effector can be of any desired shape or configuration, including but not limited to a pneumatic or electric grippers, electromagnets, vacuum grippers, mechanical tools, hooks, etc. Furthermore, end effector 66A need not be of the same type as end effector 66B. Flip axis assembly 60 is mounted on flip axis pulley 49.

Turning now to FIGS. 5A-5E, the operation of the swing arm axis and flip axis will be shown. For simplicity, FIGS. 5A-5E show only timing belt 54, motor timing pulleys 52, idler pulley 47, and flip axis pulley 49. In a preferred embodiment, a plurality of belt tension pulleys 59 are used. The change in length of the radius (r) and the rotation of the flip axis ($\alpha$) are accomplished through coordinated movement of the motors 50.

FIG. 5A shows the configuration in a neutral position. Neither motor 50 is operating. In FIG. 5B, motors 50 are operated at the same speed but in different directions from one another. This causes timing belt 54 to raise pulley 49, and concomitantly, linear rails 46 (not depicted in FIGS. 5A-5E), upwards. This will change the effective length of the swing arm (r) without imparting movement to the flip axis ($\alpha$). In FIG. 5C, the directions of motors 50 are reversed from those in FIG. 5B, thus lowering pulley 49 and linear rails 46. In. FIG. 5D, motors 50 are operated at the same speed in the same direction. This does not raise or lower the flip axis pulley but rather causes rotation of the flip axis pulley. Thus the orientation of the flip axis ($\alpha$) is changed without imparting movement to the swing arm length (r). In FIG. 5E movement of motors 50 at the same speed, in the same direction, but opposite that shown in FIG. 5D rotates flip axis pulley in the opposite direction. In short, operating motors 50 in opposite directions from each other raises or lowers the rails and the flip axis assembly, while operating motors 50 in the same direction causes tilting of the flip axis assembly. Combinations of differential motion between the motors 50, in both speed and direction, will result in movement of both the swing arm length (r) and the rotation of flip axis ($\alpha$) in varied amounts and speeds. By changing these coordinated movements through prescribed ratios and directions, simultaneous coordinated movements of the swing arm length (r) and flip axis ($\alpha$) are possible.

The robotic arm assembly of the present invention is particularly well suited for pick and place operations. By using two end effectors, the removal and replacement of parts can be done in a simple motion. For example, the robotic arm assembly 10 can be positioned near a CNC machine for positioning blank parts in and removing completed parts from the machine. The robotic arm assembly 10 can easily perform the following steps:

(1) pick up a blank part using end effector 66A, (2) carry the blank part over to the machine currently occupied with a completed part, (3) pick up the completed part in the machine using end effector 66B (at this point, both end effectors are holding parts), (4) place the blank part into the now vacant machine using end effector 66A, and (5) carry completed part using end effector 66B to the next station or loading position.

The removal and replacement of parts in the CNC machine was done with one singular motion. A robotic arm with a single end effector could not achieve such efficiency, however, it could be a useful configuration for specific tasks.

Unlike gantry robots and others which use Cartesian coordinates (X, Y, and Z) to operate, the robotic arm assembly of the present invention operates based on a polar coordinate system, using a radius (r) and an angle ($\theta$) to control the positioning of the arm. Through the manipulation of the tilt axis ($\theta$), the swing arm axis length (r), and the flip axis ($\alpha$) it is possible to position the end effector essentially anywhere within the envelope of operation. This envelope is defined by the maximum travel of the tilt axis ($\theta$), the minimum and maximum travel of the swing arm axis (r), and the combined maximum angular travel of the flip axis ($\alpha$). The envelope of operation of the assembly shown in the figures is within a single plane of travel (X, Y), but it is possible to add additional axes of manipulation, achieving a more comprehensive range of motion (Z), for example, by mounting frame 20 on a rotatable member, e.g., a slewing ring, which rotates robotic arm assembly around an axis, or by mounting frame 20 on a gantry or other system which can move the entire robotic arm assembly 10 from one location to another.

The robotic arm assembly can connect to controllers well known to those skilled in the art, e.g., programmable logic controllers, to program cycles of movement by the robotic arm.

It will be understood that the present invention includes various bearings, fastenings, power connections, and the like. Such features are not described herein in detail but are well known to those of skill in the art.

Although specific embodiments of the invention have been described herein in some detail, this has been done solely for the purposes of explaining the various aspects of the invention, and is not intended to limit the scope of the invention. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A robotic arm assembly comprising:
   a frame;
   an arm assembly pivotally mounted on said frame, said arm assembly comprising:
   a housing;

at least one linear rail slidably extending through said housing;
a first pulley mounted on a first end of said rail;
a second pulley mounted on a second end of said rail;
first and second timing pulleys;
first and second motors, said first and second motors drivingly connected to said first and second timing pulleys, respectively;
a continuous timing belt disposed on said rail and engaged with said first and second pulleys and said first and second timing pulleys;
at least one end effector pivotally connected to said second pulley;
whereby rotation of said first and second timing pulleys causes (a) said linear rail to slide through said housing, (b) said end effector to pivot, or (c) both (a) and (b).

2. The robotic arm assembly of claim 1 comprising a plurality of linear rails.

3. The robotic arm assembly of claim 2, comprising a plurality of housings, wherein each of said plurality of linear rails slidably extends through a respective housing.

4. The robotic arm assembly of claim 1 wherein rotation of said first and second motors in opposite directions causes the linear rail to slide through said housing.

5. The robotic arm assembly of claim 1 wherein rotation of said first and second motors in the same direction causes said end effector to pivot.

6. The robotic arm assembly of claim 1, further comprising a third motor operative to pivot said arm assembly relative to said frame.

7. The robotic arm assembly of claim 1, comprising a plurality of end effectors on an effector housing pivotally connected to said second pulley.

8. The robotic arm assembly of claim 1, wherein said frame is mounted on (a) a rotatable member, or (b) a gantry system.

9. The robotic arm assembly of claim 1, wherein a controller is operatively connected to said robotic arm assembly.

* * * * *